US011880536B2

(12) United States Patent
Ye et al.

(10) Patent No.: US 11,880,536 B2
(45) Date of Patent: Jan. 23, 2024

(54) TOUCH PANEL AND MOBILE TERMINAL

(71) Applicant: WUHAN CHINA STAR OPTOELECTRONICS SEMICONDUCTOR DISPLAY TECHNOLOGY CO., LTD., Hubei (CN)

(72) Inventors: Jian Ye, Hubei (CN); Pengfei Liang, Hubei (CN)

(73) Assignee: WUHAN CHINA STAR OPTOELECTRONICS SEMICONDUCTOR DISPLAY TECHNOLOGY CO., LTD., Hubei (CN)

( * ) Notice: Subject to any disclaimer, the term of this patent is extended or adjusted under 35 U.S.C. 154(b) by 112 days.

(21) Appl. No.: 17/619,266

(22) PCT Filed: Nov. 8, 2021

(86) PCT No.: PCT/CN2021/129221
§ 371 (c)(1),
(2) Date: Dec. 15, 2021

(87) PCT Pub. No.: WO2023/065409
PCT Pub. Date: Apr. 27, 2023

(65) Prior Publication Data
US 2023/0128593 A1    Apr. 27, 2023

(30) Foreign Application Priority Data
Oct. 21, 2021  (CN) .......................... 202111225618.4

(51) Int. Cl.
G06F 3/044      (2006.01)
H04M 1/02      (2006.01)

(52) U.S. Cl.
CPC .......... *G06F 3/0446* (2019.05); *H04M 1/026* (2013.01); *G06F 2203/04111* (2013.01); *H04M 2250/22* (2013.01)

(58) Field of Classification Search
CPC ......... G06F 3/0446; G06F 2203/04111; G06F 3/04164; G06F 3/0443; G06F 3/0448;
(Continued)

(56) References Cited

U.S. PATENT DOCUMENTS

| 10,514,800 | B2 * | 12/2019 | Jo | .......................... G06F 3/0412 |
| 2008/0062140 | A1 * | 3/2008 | Hotelling | .......... G02F 1/134363 345/173 |

(Continued)

FOREIGN PATENT DOCUMENTS

CN        112506373 A       3/2021

OTHER PUBLICATIONS

Chinese Office Action issued in corresponding Chinese Patent Application No. 202111225618.4 dated Mar. 12, 2023, pp. 1-4.

*Primary Examiner* — Amy Onyekaba
(74) *Attorney, Agent, or Firm* — Mark M. Friedman

(57) ABSTRACT

The present application discloses a touch panel and a mobile terminal; a touch layer of the touch panel includes a plurality of third electrode groups, a plurality of first electrode groups arranged in parallel, and a plurality of second electrode groups arranged in parallel and intersecting the plurality of first electrode groups, which all three are insulated from each other. The plurality of first electrode groups, the plurality of second electrode groups, and the plurality of third electrode groups are electrically connected to a functional chip, the plurality of third electrode groups are connected to each other and electrically connected to a third peripheral wire, or are insulated from each other.

19 Claims, 6 Drawing Sheets

(58) Field of Classification Search
CPC . H04M 1/026; H04M 2250/22; H04M 1/0266
See application file for complete search history.

(56) References Cited

U.S. PATENT DOCUMENTS

| | | | | |
|---|---|---|---|---|
| 2015/0234495 | A1* | 8/2015 | Lo | G06F 3/045 |
| | | | | 345/174 |
| 2017/0083142 | A1* | 3/2017 | Wang | G09G 3/3677 |
| 2017/0193275 | A1* | 7/2017 | Liu | G06V 40/1306 |
| 2017/0255287 | A1* | 9/2017 | Huang | G06F 3/0445 |
| 2017/0255303 | A1* | 9/2017 | Huang | G06F 3/04164 |
| 2018/0267644 | A1* | 9/2018 | Xie | G06F 3/0446 |
| 2019/0204949 | A1* | 7/2019 | Zhao | G06F 3/0443 |
| 2020/0183518 | A1* | 6/2020 | Na | G06F 3/0443 |
| 2020/0363893 | A1* | 11/2020 | Kim | G06F 3/0418 |
| 2021/0405819 | A1* | 12/2021 | Seo | G06F 3/0443 |
| 2022/0317806 | A1* | 10/2022 | Fan | G06F 3/0446 |
| 2022/0334678 | A1* | 10/2022 | Long | G06F 3/0412 |
| 2022/0357816 | A1* | 11/2022 | Wen | G09G 3/035 |
| 2022/0413677 | A1* | 12/2022 | Zhang | G06F 3/0443 |
| 2023/0043343 | A1* | 2/2023 | Cho | G06F 3/0448 |

* cited by examiner

TOUCH PANEL AND MOBILE TERMINAL

FIELD OF INVENTION

The present application relates to a display technology field, in particular to a display panel manufacturing field, and specifically to a touch panel and a mobile terminal.

BACKGROUND OF INVENTION

In use of a smartphone, a distance sensor is usually provided to blank the screen during operations such as answering a call, so as to realize a function of reducing power consumption.

However, existing smartphones mainly control whether the screen is blanked by providing an infrared sensor below the screen to sense a distance from the face; in this way, since the infrared sensor need to be provided separately below the screen, the manufacturing difficulty and cost of the smartphone are increased, which is disadvantageous to the development of the smartphone having a distance sensing function.

In summary, it is necessary to provide a touch panel and a mobile terminal that may reduce manufacturing difficulty and cost of a smartphone.

SUMMARY OF INVENTION

Technical Problem

Embodiments of the present application provide a touch panel and a mobile terminal to solve existing problems such as difficulty in manufacturing a smartphone and increased cost due to a need to separately provide an infrared sensor below a screen.

Technical Solution

Embodiments of the present application provide a touch panel comprising a touch layer and a functional chip, the touch layer comprises:
a plurality of first electrode groups extending in a first direction and arranged in a second direction;
a plurality of second electrode groups extending in the second direction and arranged in the first direction, wherein the plurality of first electrode groups and the plurality of second electrode groups are electrically connected to the functional chip; and
a plurality of third electrode groups, the first electrode groups, the second electrode groups, and the third electrode groups are i disposed insulated from each other,
wherein the plurality of third electrode groups are connected to each other and electrically connected to a third peripheral wire to be electrically connected to the functional chip, or the plurality of third electrode groups are disposed insulated from each other and each of the third electrode groups is connected to a corresponding first wire to be electrically connected to the functional chip;
wherein each of the second electrode groups comprises a second stem electrode group extending in the second direction and a plurality of second branch electrodes connected to both sides of the second stem electrode group, and second openings are defined in some or all of the second branch electrodes;
wherein the plurality of third electrode groups extend in the first direction and are arranged in the second direction, each of the third electrode groups comprises a plurality of first electrode blocks corresponding to a plurality of the second openings arranged in the first direction, each of the first electrode blocks is located in a corresponding second opening, and the plurality of first electrode blocks in a same third electrode group are electrically connected;
wherein the plurality of first electrode groups and the plurality of second electrode groups intersect to form a plurality of touch cells, the plurality of touch cells are arranged in the first direction and the second direction, each of the touch cells comprises a first electrode, a second electrode, and a third electrode, the first electrode is disposed around the second electrode.

In an embodiment, during a first period, each of the first electrode groups is electrically connected to a corresponding first peripheral wire, and each of the second electrode groups is electrically connected to a corresponding second wire, so that the plurality of first electrode groups and the plurality of second electrode groups perform a first function; and
during a second period, each of the second electrode groups is electrically connected to a corresponding second peripheral wire, so that the plurality of third electrode groups and the plurality of first electrode groups perform a second function.

In an embodiment, the touch layer further comprises:
a plurality of fourth electrode groups extending in the second direction and arranged in the first direction, wherein the first electrode groups, the second electrode groups, the third electrode groups and the fourth electrode groups are insulated;
wherein each of the first electrode groups comprises a first stem electrode group extending in the first direction and a plurality of first branch electrodes connected to both sides of the first stem electrode group, and first openings are defined in some or all of the first branch electrodes;
wherein each of the fourth electrode groups comprises a plurality of second electrode blocks corresponding to a plurality of first openings arranged in the second direction, and each of the second electrode blocks is located in a corresponding first opening.

In an embodiment, the plurality of second electrode blocks in a same fourth electrode group are electrically connected, and each of the fourth electrode groups is electrically connected to a second wire, so that the plurality of third electrode groups and the plurality of fourth electrode groups perform a third function.

In an Embodiment:
in the first direction, every two adjacent first electrodes in the plurality of touch cells are electrically connected to form a corresponding one of the first electrode groups, every two adjacent third electrodes in the plurality of touch cells are electrically connected to form a corresponding one of the third electrode groups, and two second electrodes in two adjacent touch cells are disposed insulated from each other;
in the second direction, every two adjacent second electrodes in the plurality of touch cells are electrically connected to form a corresponding one of the second electrode groups, and two first electrodes in two adjacent touch cells are disposed insulated from each other.

In an embodiment, in the touch cell, the first electrode comprises two first stem electrodes arranged in the first direction, the second electrode comprises the second stem electrode extending in the second direction, and the two first stem electrodes in a same first electrode are electrically connected by a bridge insulated from the second stem electrode.

In an embodiment, each of the touch cells comprises four repeating units arranged in a matrix and symmetric about a center of the touch cell, the first electrode further comprises a plurality of first branch electrodes connected to both sides of the first stem electrode, and the second electrode further comprises the second branch electrodes connected to the second stem electrode;

in each of the repeating units, the first branch electrode comprises two first sub-branch electrodes arranged in axial symmetry and connected to each other, a symmetry axis of the two first sub-branch electrodes is parallel to the first direction, in each of the repeating units, the second branch electrode comprise two second sub-branch electrodes arranged in axial symmetry and connected, a symmetry axis of the two second sub-branch electrodes is parallel to the second direction, a second opening is defined in each of the second sub-branch electrodes, a third electrode is provided in each of the second openings, and a plurality of third electrodes arranged in the first direction are electrically connected to form one of the third electrode groups.

Embodiments of the present application provide a touch panel comprising a touch layer and a functional chip, the touch layer comprises:

a plurality of first electrode groups extending in a first direction and arranged in a second direction;

a plurality of second electrode groups extending in the second direction and arranged in the first direction, the plurality of first electrode groups and the plurality of second electrode groups are electrically connected to the functional chip; and a plurality of third electrode groups, the first electrode groups, the second electrode groups and the third electrode groups are disposed insulated from each other;

wherein the plurality of third electrode groups are connected to each other and electrically connected to a third peripheral wire to be electrically connected to the functional chip, or the plurality of third electrode groups are disposed insulated from each other and each of the third electrode groups is connected to a corresponding first wire to be electrically connected to the functional chip.

In an embodiment, each of the second electrode groups comprises a second stem electrode group extending in the second direction and a plurality of second branch electrodes connected to both sides of the second stem electrode group, and second openings are defined in some or all of the second branch electrodes;

wherein the plurality of third electrode groups extend in the first direction and are arranged in the second direction, each of the third electrode groups comprises a plurality of first electrode blocks corresponding to a plurality of second openings arranged in the first direction, each of the first electrode blocks is located in a corresponding second opening, and a plurality of first electrode blocks in a same third electrode group are electrically connected.

In an embodiment, during a first period, each of the first electrode groups is electrically connected to a corresponding first peripheral wire, and each of the second electrode groups is electrically connected to a corresponding second wire, so that the plurality of first electrode groups and the plurality of second electrode groups perform a first function; and during a second period, each of the second electrode groups is electrically connected to a corresponding second peripheral wire, so that the plurality of third electrode groups and the plurality of first electrode groups are used to perform a second function, wherein the first function is a touch function, and the second function is a distance measuring function.

In an embodiment, the touch layer further comprises:
a plurality of fourth electrode groups extending in the second direction and arranged in the first direction, wherein the first electrode groups, the second electrode groups, the third electrode groups and the fourth electrode groups are insulated;

wherein each of the first electrode groups comprises a first stem electrode group extending in the first direction and a plurality of first branch electrodes connected to both sides of the first stem electrode group, and first openings are defined in some or all of the first branch electrodes;

wherein each of the fourth electrode groups comprises a plurality of second electrode blocks corresponding to a plurality of first openings arranged in the second direction, and each of the second electrode blocks is located in a corresponding first opening.

In an embodiment, a plurality of second electrode blocks in a same fourth electrode group are electrically connected, and each of the fourth electrode groups is electrically connected to a second wire, so that the plurality of third electrode groups and the plurality of fourth electrode groups are used to perform a third function.

In an embodiment, the plurality of fourth electrode groups are connected to each other or insulated from each other.

In an embodiment, the plurality of first electrode groups and the plurality of second electrode groups intersect to form a plurality of touch cells, the plurality of touch cells are arranged in the first direction and the second direction, each of the touch cells comprises a first electrode, a second electrode, and a third electrode, and the first electrode is disposed around the second electrode;

in the first direction, every two adjacent first electrodes in the plurality of touch cells are electrically connected to form a corresponding one of the first electrode groups, every two adjacent third electrodes in the plurality of touch cells are electrically connected to form a corresponding one of the third electrode groups, and two second electrodes in two adjacent touch cells are disposed insulated from each other;

in the second direction, every two adjacent second electrodes in the plurality of touch cells are electrically connected to form a corresponding one of the second electrode groups, and two first electrodes in two adjacent touch cells are disposed insulated from each other.

In an embodiment, in the touch cell, the first electrode comprises two first stem electrodes arranged in the first direction, the second electrode comprises the second stem electrode extending in the second direction, and the two first stem electrodes in a same first electrode are electrically connected by a bridge insulated from the second stem electrode.

In an embodiment, each of the touch cells comprises four repeating units arranged in a matrix and symmetric about a center of the touch cell, the first electrode further comprises a plurality of first branch electrodes connected to both sides of the first stem electrode, and the second electrode further comprises second branch electrodes connected to the second stem electrode;

in each of the repeating units, the first branch electrode comprises two first sub-branch electrodes arranged in axial symmetry and connected to each other, a symmetry axis of the two first sub-branch electrodes is parallel to the first direction, in each of the repeating units, the second branch electrode comprise two second sub-branch electrodes arranged in axial symmetry and connected, a symmetry axis of the two second sub-branch electrodes is parallel to the second direction, a second opening is defined in each of the second sub-branch electrodes, a third electrode is provided in each of the second openings, and a plurality of third electrodes arranged in the first direction are electrically connected to form one of the third electrode groups.

In an embodiment, in the first direction, a first bridge is provided in the repeating unit, and a second bridge is provided between two adjacent repeating units;

wherein the first bridge crosses and is insulated from a connecting portion between the two first sub-branch electrodes disposed in axial symmetry, and extends along both sides in the first direction to be electrically connected to the two third electrodes in a same repeating unit, and the second bridge crosses and is insulated from a corresponding second stem electrode to be electrically connected to two adjacent third electrodes included in the two adjacent repeating units.

In an embodiment, the first electrode groups, the second electrode groups, and the third electrode groups are formed of metal grids, and the first electrode groups, the second electrode groups, and the third electrode groups are disposed insulated from each other through fractures of the metal grids.

In an embodiment, the touch panel further comprises:

a pixel layer disposed opposite to the touch layer, the pixel layer comprises a plurality of subpixels, the metal grid comprises a plurality of grid cells, and each of the subpixels is located in a corresponding grid cell.

Embodiments of the present application provide a mobile terminal comprising a terminal body and a touch panel as described above, the terminal body and the touch panel are integrated.

Advantageous Effects

A touch panel and a mobile terminal are provided by embodiments of the present application, the touch panel includes a touch layer and a functional chip, the touch layer includes: a plurality of first electrode groups extending in a first direction and arranged in a second direction; a plurality of second electrode groups extending in the second direction and arranged in the first direction, the plurality of first electrode groups and the plurality of second electrode groups are electrically connected to the functional chip; a plurality of third electrode groups extending in the second direction and arranged in the first direction, any of the first electrode groups, any of the second electrode groups and any of the third electrode groups are insulated; wherein the plurality of third electrode groups are connected to each other and electrically connected to a third peripheral wire to be electrically connected to the functional chip, or the plurality of third electrode groups are disposed to be insulated from each other and each of the third electrode groups is connected to a corresponding first wire to be electrically connected to the functional chip. Compared with the prior art, the plurality of third electrode groups for implementing the corresponding functions in the present application are also located in the touch layer, that is, it may be avoided providing a structure independent of the touch layer to implement the corresponding functions, the manufacturing difficulty and cost of the touch panel and the mobile terminal are reduced, and the development of the smart phone having the distance sensing function is facilitated.

DESCRIPTION OF DRAWINGS

The technical solutions and other beneficial effects of the present application will be apparent by describing the specific implementations of the present application in detail below in conjunction with the accompanying drawings.

DETAILED DESCRIPTION OF EMBODIMENTS

Figure 1:
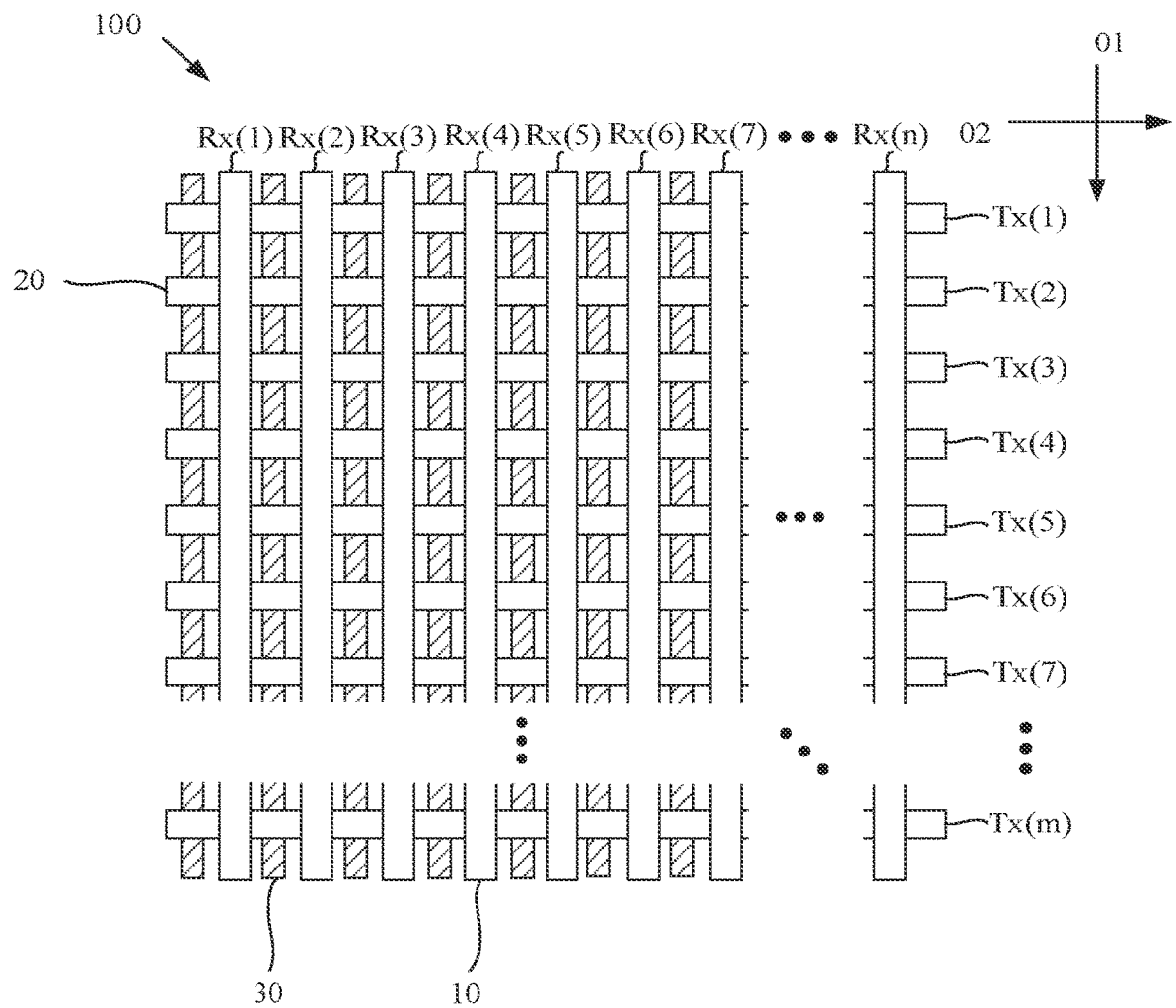
FIG. 1 is a schematic top view of a first embodiment of a touch layer according to an embodiment of the present application.

Technical solutions in embodiments of the present application will be clearly and continuously described below in conjunction with drawings in the embodiments of the present application. Obviously, the described embodiments are only a part of embodiments of the present application, rather than all the embodiments. Based on the embodiments in the present application, all other embodiments obtained by those skilled in the art without creative work fall within the protection scope of the present application.

In the description of the present application, the terms "first", "second", etc. are only used for descriptive purposes, and cannot be understood as indicating or implying relative importance or implicitly indicating the number of indicated technical features. Therefore, the features defined with "first" and "second" may explicitly or implicitly include one or more of the features. In the description of the present application, "multiple" means two or more than two, unless otherwise specifically defined, "electrically connected" means that two elements are electrically connected, and are not limited to direct connection or indirect connection. In addition, it should be noted that the drawings only provide structures closely related to the application, and omit some details that are not relevant to the application. The purpose is to simplify the drawings so that the inventive concepts are clear at a glance, rather than showing that the device in the actual situation is exactly the same as those shown in the drawings, and those shown in the drawings are not the limitation of the actual device.

The present application provides a touch panel including, but not limited to, the following embodiments and combinations of the following embodiments.

Figure 2:
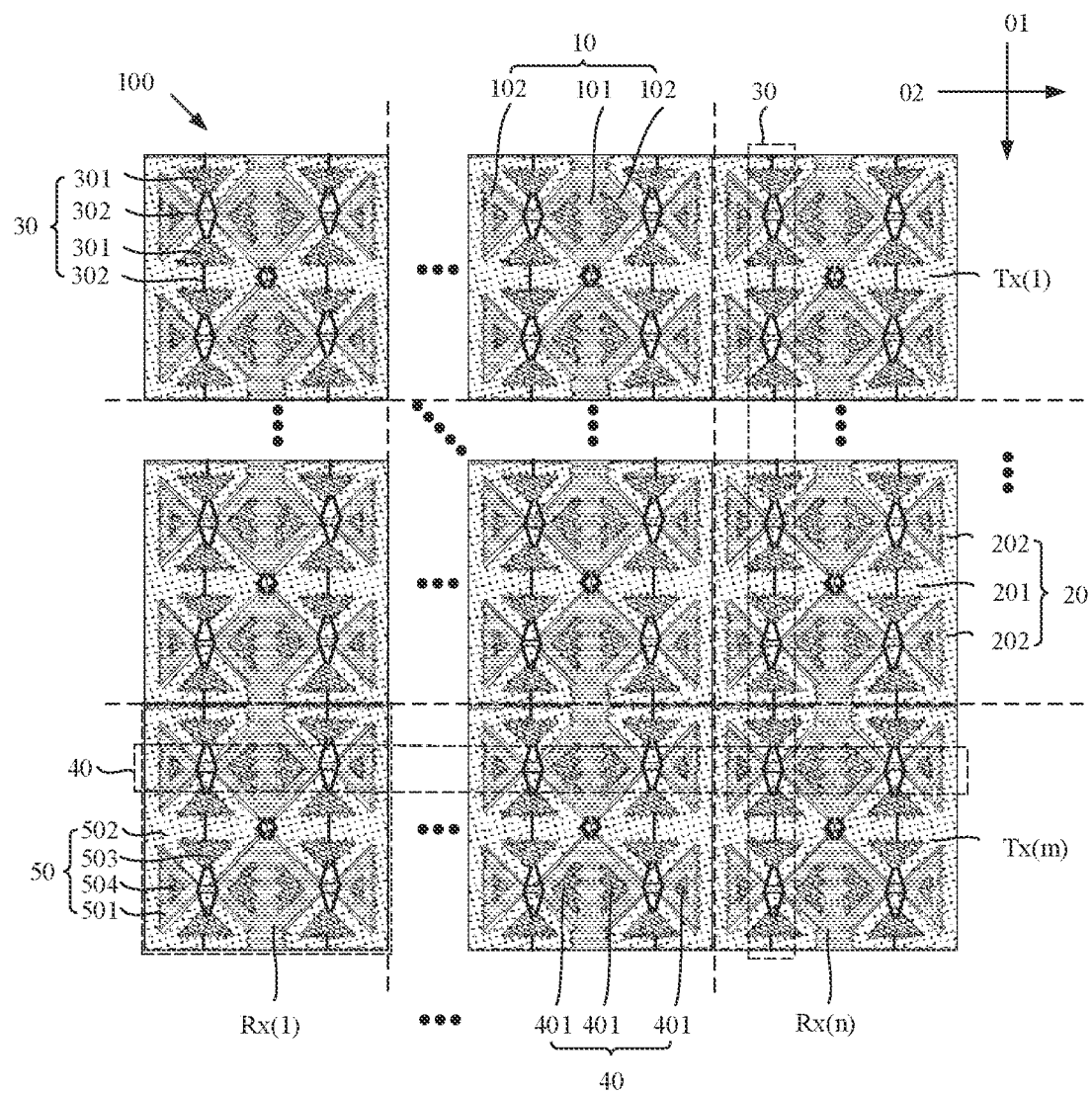
FIG. 2 is a schematic top view of a second embodiment of the touch layer according to an embodiment of the present application.

In an embodiment, as shown in FIGS. 1 and 2, the touch panel includes a touch layer 100 and a functional chip, and the touch layer 100 includes: a plurality of first electrode groups 10 extending in a first direction 01 and arranged in a second direction 02; a plurality of second electrode groups 20 extending in the second direction 02 and arranged in the first direction 01, the plurality of first electrode groups 10 and the plurality of second electrode groups 20 are electrically connected to the functional chip; a plurality of third electrode groups 30, the first electrode group 10 and the second electrode group 20 are insulated from the third electrode group 30, wherein the plurality of third electrode groups 30 are connected to each other and electrically connected to a third peripheral wire 903 to electrically connect to the functional chip, or the plurality of third electrode groups 30 are disposed insulated from each other and each of the third electrode groups 30 is connected to a corresponding first wire to electrically connect to the functional chip.

The first direction 01 may be, but is not limited to, a vertical upward direction or a vertical downward direction, the second direction 02 may be, but is not limited to, a horizontally left direction or a horizontally right direction. Here, the first direction 01 is a vertical upward direction or a vertical downward direction, and the second direction 02 is a horizontally left direction or a horizontally right direction. That is, the plurality of first electrode groups 10 extend in a vertical direction and are arranged in a horizontal direction, and the plurality of second electrode groups 20 extend in a horizontal direction and are arranged in a vertical direction. Two adjacent first electrode groups 10 may be spaced apart to be disposed insulated from each other, and two adjacent second electrode groups 20 may be spaced apart to be disposed insulated from each other. It should be noted that an arrangement position and manner of the plurality of third electrode groups 30 are not limited here, as long as there are a plurality of third electrode groups 30 meeting the above requirements in this embodiment. Specifically, the plurality of third electrode groups 30 may be dummy electrodes in the prior art, which are provided as above.

Specifically, as shown in FIGS. 1 and 2, the touch layer 100 may include n first electrode groups 10 arranged in the second direction 02, and m second electrode groups 20 arranged in the first direction 01. When the first electrode groups 10 are touch sensing electrodes Rx and the second electrode groups 20 are touch emitting electrodes Tx, the first electrode group 10 in a first column to the first electrode group 10 in an n-th column along the second direction 02 are respectively Rx(1), Rx(2), . . . , Rx(n), and the second electrode group 20 in a first row to the second electrode group 20 in an m-th row along the first direction 01 are respectively Tx(1), Tx(2), . . . , Tx(m).

Wherein, shapes of the first electrode group 10 and the second electrode group 20 are not limited here, regardless of whether outer contours of the two are regular or not, the above "extend" and "arrange" may be understood as limiting the rectangles of the outer contours of the first electrode group 10 and the second electrode group 20 that are similar in shape and size. Of course, there is no restriction on whether the first electrode groups 10 and the second electrode groups 20 are continuous, or hollow. Specifically, as shown in FIG. 1, the first electrode group 10 may be a solid pattern, and at least one of the third electrode group 30 may be provided between two adjacent first electrode groups 10. It can be understood that a gap between the two adjacent first electrode groups 10 may be fully utilized to avoid adding a space to dispose the third electrode group 30. As shown in FIG. 2, the second electrode group 20 may be a hollow pattern, and the third electrode group 30 may be filled in a hollow region of the second electrode group 20.

It may be understood that, in this embodiment, the third electrode groups 30 are also located in the touch layer 100 including the first electrode groups 10 and the second electrode groups 20. The first electrode groups 10, the second electrode groups 20, and the third electrode groups 30 are electrically connected to the functional chip. That is, the functional chip may also perform signal transmission with the third electrode groups 30, on the basis of performing signal transmission with the first electrode groups 10 and the second electrode groups 20, to implement other functions, and avoid occupying additional space to provide other chips for signal transmission with the third electrode groups 30. Compared with the prior art, in the present embodiment, the plurality of third electrode groups 30 for implementing corresponding functions are also provided in the touch layer 100. In conjunction with the discussion above, the plurality of third electrode groups 30 may be formed by providing the dummy electrodes in the prior art as above, that is, it may avoid providing a structure independent of the touch layer 100 to implement other functions, thereby effectively reducing manufacturing difficulty and cost of the touch panel and the mobile terminal, and facilitating development of a smartphone having a multi-function sensing function.

In an embodiment, as shown in FIG. 2, each of the first electrode groups 10 includes a first stem electrode group 101 extending in the first direction 01 and a plurality of first branch electrodes 102 connected to both sides of the first stem electrode group 101, and first openings are defined in some of or all of the first branch electrodes 102; each of the second electrode groups 20 includes a second stem electrode group 201 extending in the second direction 02 and a plurality of second branch electrodes 202 connected to both sides of the second stem electrode group 201, and second openings are defined in some or all of the second branch electrodes 202. The plurality of third electrode groups 30 extend in the first direction 01 and are arranged in the second direction 02, each of the third electrode groups 30 includes a plurality of first electrode blocks 301 corresponding to a plurality of second openings arranged in the first direction 01, each of the first electrode blocks 301 is located in a corresponding second opening, and the plurality of first electrode blocks 301 in the same third electrode group 30 are electrically connected.

It should be noted that, as shown in FIG. 1, since the plurality of first electrode groups 10 and the plurality of third electrode groups 30 are arranged in parallel, the plurality of first electrode groups 10 and the plurality of third electrode groups 30 may be arranged in the same layer or in different layers; further, because the plurality of first electrode groups 10 and the plurality of third electrode groups 30 are intersectedly disposed with the plurality of second electrode groups 20, the plurality of first electrode groups 10 and the plurality of third electrode groups 30 are disposed in a same layer is taken as an example for description. Thus, a portion of each of the second electrode group 20 intersecting with the first electrode group 10 and the third electrode group 30 may be disposed in a different layer from any one of the first electrode group 10 and the third electrode group 30, or, in a same way, a portion of the second electrode group 20 and a portion of the third electrode group 30 intersecting the first electrode group 10 may be disposed in a different layer from the first electrode group 10. Specifically, for the shape and size of the third electrode group 30, reference may also be made to the relevant description above regarding the shape and size of the first electrode group 10.

On the one hand, the defining of the second opening in at least one of the second branch electrodes 202 in this embodiment may reduce the area of projection of the plurality of second electrode groups 20 on a cathode layer, that is, an area of the plurality of second electrode groups 20 facing the cathode layer is reduced, the parasitic capacitance between the plurality of second electrode groups 20 and the cathode layer is reduced, thereby reducing an RC Loading of the plurality of second electrode groups 20, and alleviating an electrical signal attenuation in the plurality of second electrode groups 20. According to the above analysis, a larger a total area of the plurality of second openings is, more obvious an improvement of the electrical signal attenuation in the plurality of second electrode groups 20 is.

On the other hand, in this embodiment, compared with providing only the second stem electrode group 201, providing the plurality of second branch electrodes 202 connected to both sides of the second stem electrode group 201 may reduce impedance of the second electrode group 20, thereby reducing the RC Loading of the plurality of second electrode groups 20. Further, the second opening in this embodiment is defined in the second branch electrode 202, so that the excessive increase of the impedance of the second electrode group 20 due to an opening in the second stem electrode group 201 may be avoided. That is, in this embodiment, the impedance of the second electrode group 20 may be minimally increased while the electrical signal attenuation in the plurality of second electrode groups 20 is alleviated, and the RC Loading of the plurality of second electrode groups 20 may be further reduced.

In another aspect, in the present embodiment, the first electrode block 301 is provided in at least one of the second openings, so as to avoid large optical differences between the regions in which the second openings are located in the touch layer 100 and the other regions, thereby reducing difference in the film layer structures of the different regions in the second electrode group 20, and improving the uniformity of light outputted from the subpixels in the different regions.

It may be understood that, in the present embodiment, while realizing the beneficial effect, since the second openings are provided, a space in the second opening is fully utilized through providing a corresponding first electrode block 301 in the second opening in the present embodiment, and an extra reserved space between two adjacent first electrode group 10 to dispose the first electrode block 301 is avoided, so that the space of the touch layer 100 may be saved to further provide more first electrode groups 10 to improve the touch resolution. Specifically, two adjacent first electrode blocks 301 may be electrically connected by a bridge 302.

In an embodiment, with reference to FIG. 3, and FIGS. 4 to 6, during a first period t1, each of the first electrode groups 10 is electrically connected to a corresponding first peripheral wire 901, and each of the second electrode groups 20 is electrically connected to a corresponding second wire, so that the plurality of first electrode groups 10 and the plurality of second electrode groups 20 perform a first function; during a second period t2, each of the second electrode groups 20 is electrically connected to a corresponding second peripheral wire 902, so that the plurality of third electrode groups 30 and the plurality of second electrode groups 20 perform a second function.

It should be noted that, since the function of the first electrode group 10 and the function of the second electrode group 20 are not limited in the full text, that is, it may be considered that the signals transmitted by the first electrode group 10 and the second electrode group 20 may be replaceable, therefore it is possible for each of the first electrode group 10 to be electrically connected to a corresponding first wire during the second period t2, so that the plurality of third electrode groups 30 and the plurality of first electrode groups 10 perform a second function. According to the above discussion, the plurality of first electrode groups 10 or the plurality of second electrode groups 20 in the present embodiment may implement the first function and the second function, respectively, at different stages. Wherein, the first function may be, but is not limited to, a touch function, and the second function may be, but is not limited to, a distance measurement function. In the full text, only an example in which the first function is a touch function, and the second function is a distance measurement function will be described. It should be noted that the specific arrangement of the touch control structure composed of the first electrode groups 10 and the second electrode groups 20 is not limited in the present application.

Figure 3:
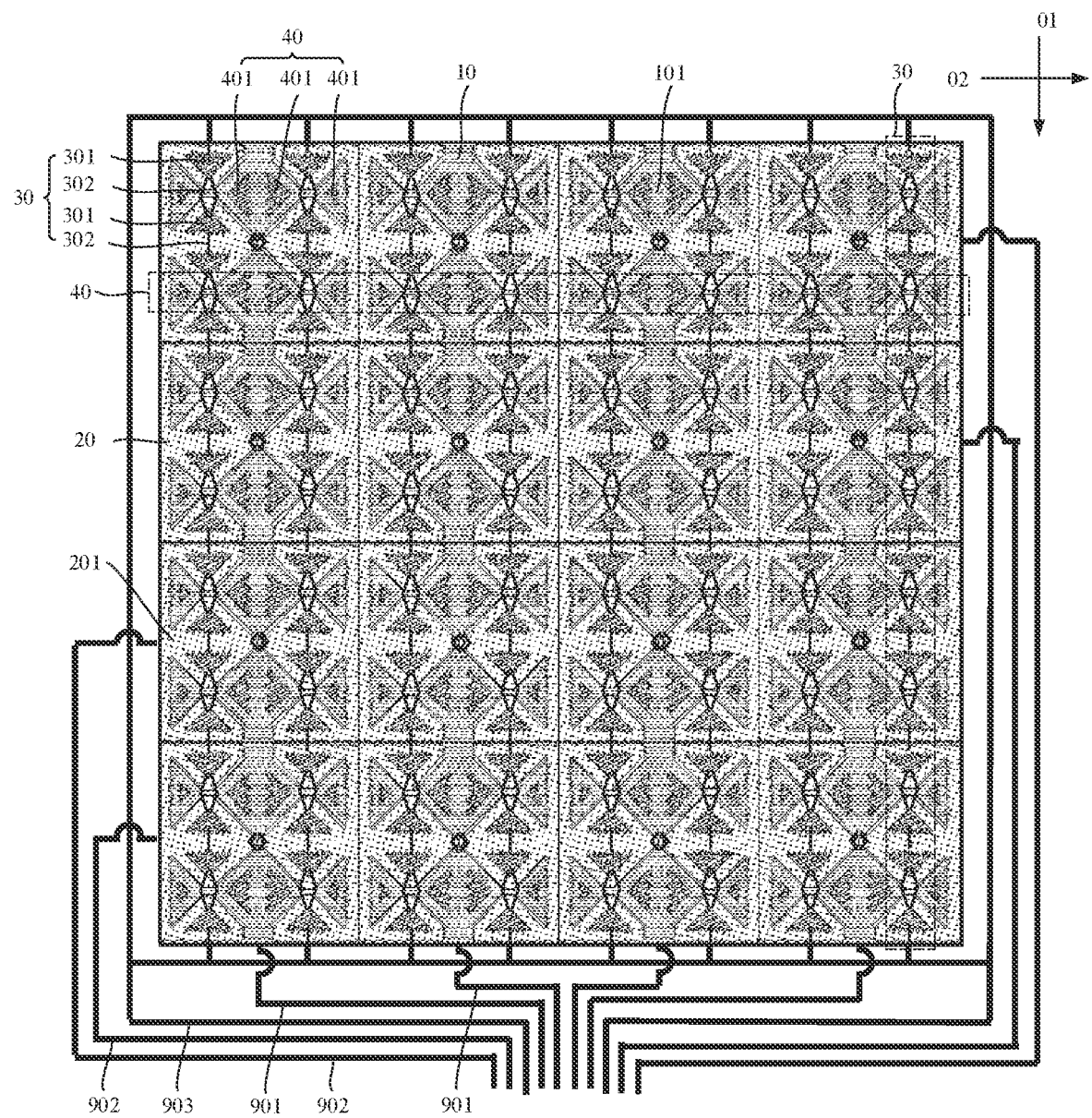
FIG. 3 is a schematic top view of a third embodiment of the touch layer according to an embodiment of the present application.
Figure 4:
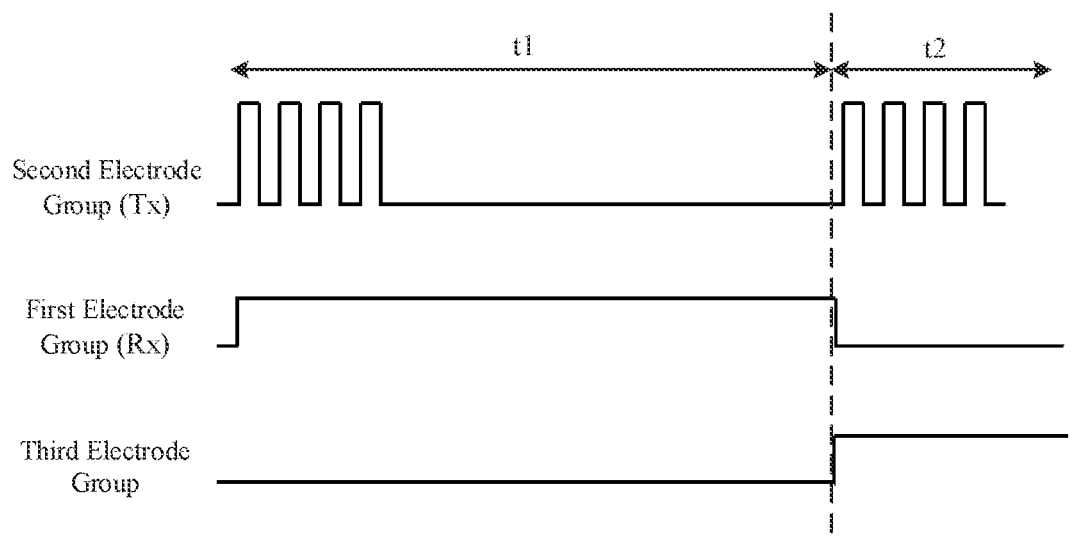
FIG. 4 is a first timing diagram of a first electrode group, a second electrode group, and a third electrode group according to an embodiment of the present application.

Specifically, with reference to FIGS. 3 and 4, during a first period t1, an example, in which the first electrode groups 10 are used as touch sensing electrodes and the second electrode groups 20 are used as touch emitting electrodes to constitute a mutual-capacitive touch structure, is described. An end of each of the first electrode group 10 used as the touch sensing electrode may be electrically connected to a sensing signal pin in the functional chip through a corresponding first peripheral wire 901 to transmit sensing signal to the functional chip; an end of each of the second electrode groups 20 used as touch emitting electrodes may be electrically connected to a driving signal pin in the functional chip through a corresponding second peripheral wire 902 to receive and transmit touch signal to the touch layer 100. As shown in FIG. 4, the touch signal applied to the second electrode group 20 may be a square wave signal having a voltage of 0 to 5V and a frequency of 100 Khz to 200 Khz, the operation signal applied to the first electrode group 10 may be a constant voltage signal having a voltage of 0 to 5V, and the signal applied to each of the third electrode groups 30 may be a ground signal to maintain the third electrode group 30 in an inoperative state. Of course, the functions, and connection relationships of the plurality of first electrode groups 10 and the plurality of second electrode groups 20 may be interchangeable at a same time.

Figure 5:
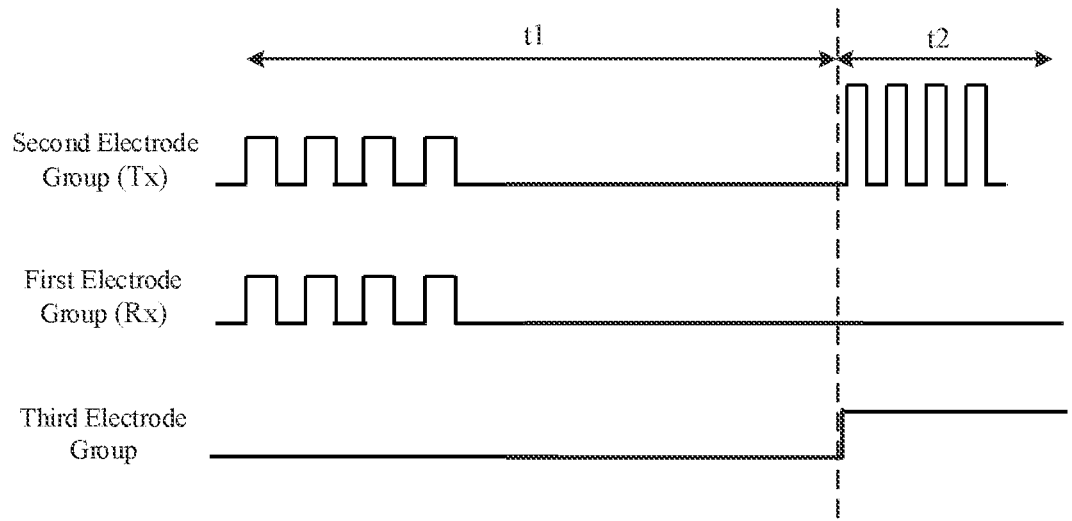
FIG. 5 is a second timing diagram of the first electrode group, the second electrode group, and the third electrode group according to an embodiment of the present application.

Specifically, with reference to FIGS. 3 and 5, during a first period t1, an example, in which the first electrode groups 10 and the second electrode groups 20 are used as touch sensing electrodes to constitute a self-capacitive touch structure, is described. An end of each of the second electrode groups 20 used as the touch sensing electrodes may be electrically connected to a driving signal pin in the functional chip through a corresponding second peripheral wire 902 to receive and transmit the touch signal to the touch layer 100; an end of each of the first electrode groups 10 of the touch sensing electrodes may be electrically connected to a driving signal pin in the functional chip through a corresponding first peripheral wire 901 to receive and transmit touch signal to the touch layer 100; an end of each of the third electrode groups 30 may be maintained in an inoperative state by grounding. As shown in FIG. 5, the touch signals applied to the first electrode groups 10 and the second electrode groups 20 may be square wave signals having a voltage of 0 to 5V and a frequency of 100 Khz to 200 Khz, and the signal applied to each of the third electrode groups 30 may be ground signal to maintain the third electrode group 30 in an inoperative state.

Figure 6:
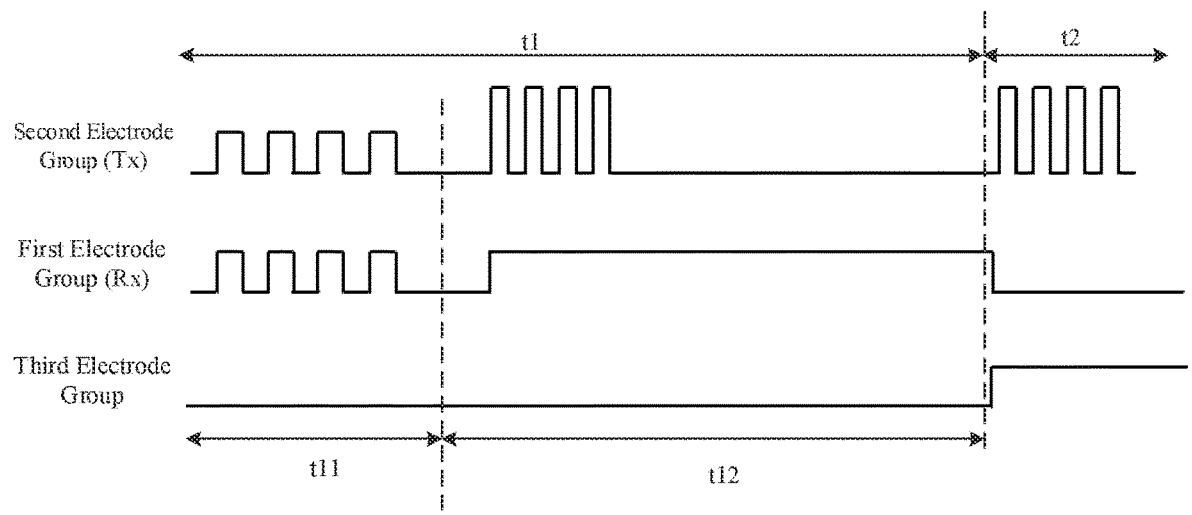
FIG. 6 is a third timing diagram of the first electrode group, the second electrode group, and the third electrode group according to an embodiment of the present application.

Specifically, with reference to FIGS. 3 and 6, during a first period t1, an example, in which the first electrode groups 10 and the second electrode groups 20 serve as touch sensing electrodes to constitute a self-capacitive touch structure during a first sub-period 01, and the first electrode groups 10 used as touch sensing electrodes and the second electrode groups 20 used as touch emitting electrodes to constitute a mutual-capacitive touch structure during a second sub-period t12, is described here. Specifically, the specific settings within the first sub-period t11 may be referred to the related description above with respect to FIG. 5, and the specific settings within the second sub-period t12 may be referred to the related description above with respect to FIG. 4.

The distance measuring function may be understood as measuring a distance between the touch panel and the external object when the touch panel is close to the external object for a non-touch operation, so that the touch panel determines whether to perform a blank screen operation. Specifically, since a magnitude of the distance between the touch panel and the external object affects the capacitance and the charge amount between two conductors inside the touch panel, the distance between the touch panel and the external object may be calculated by indirectly measuring the capacitance between the plurality of third electrode groups 30 and the plurality of first electrode groups 10, or indirectly measuring the capacitance between the plurality of third electrode groups 30 and the plurality of second electrode groups 20. Specifically, here, an example, in which the plurality of third electrode groups 30 and the plurality of first electrode groups 10 are used to implement the distance measuring function, and the functional chips includes a first functional chip for implementing the first function and a second functional chip for implementing the second function, is explained.

When the plurality of third electrode groups 30 are connected to each other and electrically connected to the third peripheral wire 903 to be electrically connected to the functional chip, as shown in FIG. 3, and FIGS. 4 to 6, an example, in which an electrode disposed opposite to the plurality of second electrode groups 20 may be formed by the plurality of third electrode groups 30, and during the second period t2, the plurality of second electrode groups 20 in the present embodiment may be electrically connected to the distance measurement driving pins in the second functional chip sequentially through the corresponding plurality of second peripheral wires 902 under the control of a switching module to send a plurality of distance measurement driving signals to the touch layer 100, is described. In conjunction with the above discussion, during the period when each of the second electrode groups 20 sends a distance measurement driving signal to the touch layer 100 to the next second electrode group 20 sends a distance measurement driving signal to the touch layer 100, the plurality of the electrically connected third electrode groups 30 are electrically connected to the distance measurement sensing pins in the second functional chip through the peripheral wire 903 to send the generated corresponding distance measurement sensing signals to the second functional chip. The third peripheral wire 903 may be connected to at least one end of either ends of the plurality of third electrode groups 30. As shown in FIGS. 4 to 6, the distance measurement driving signal applied to the second electrode group 20 may be a square wave signal having a voltage of 0 to 5V and a frequency of 100 Khz to 200 Khz, the operating signal applied to the third electrode group 30 may be a constant voltage signal having a voltage of 0 to 5V, and the signal applied to each of the first electrode groups 10 may be a ground signal to maintain the first electrode group 10 in an inoperative state.

Similarly, the functions and connection relationships of the plurality of second electrode groups 20 and the plurality of third electrode groups 30 may be interchangeable at a same time, that is, after the plurality of third electrode groups 30 electrically connected transmit the distance measurement driving signals to the touch layer 100, the plurality of second electrode groups 20 may simultaneously or sequentially transmit the generated plurality of distance measurement sensing signals to the distance measurement sensing pins in the second function chip through the second peripheral wires 902. Of course, the plurality of third electrode groups 30 and the plurality of first electrode groups 10 may be used to implement the second function.

When the plurality of third electrode groups 30 are insulatedly disposed and each of the electrode groups 30 is electrically connected to a corresponding first wire to be electrically connected to the functional chip, a plurality of the electrode group 30 can form a plurality of capacitance with the first electrode group 10. Referring to the above discussion, in the stage of realizing the second function, an example, in which the plurality of first electrode groups 10 may be electrically connected, in turn, to the distance measurement driving pins in the second function chip through the first peripheral wires 901, and under a control of the switching module to transmit a plurality of distance measurement driving signals to the touch layer 100, is described. During the period when each of the first electrode groups 10 transmits a distance measurement driving signal to the touch layer 100 to the next first electrode group 10 transmits a distance measurement driving signal to the touch layer 100, the plurality of third electrode groups 30 insulated from each other may sequentially transmit generated corresponding distance measurement sensing signals to the second function chip. Similarly, the functions and connection relationships of the plurality of first electrode groups 10 and the plurality of third electrode groups 30 may be interchangeable at a same time. Of course, the plurality of third electrode groups 30 and the plurality of second electrode groups 20 may also be used to implement the second function.

In an embodiment, as shown in FIG. 2, the touch layer 100 further includes a plurality of fourth electrode groups 40 extending in the second direction 02 and arranged in the first direction 01. The first electrode groups 10, the second electrode groups, the third electrode groups, and the fourth electrode groups are disposed insulated from each other. Each of the first electrode groups 10 includes a first stem electrode group 101 extending in the first direction 01 and a plurality of first branch electrodes 102 connected to both sides of the first stem electrode group 101, and first openings are provided in some or all of the first branch electrodes 102; each of the second electrode groups 20 includes a second stem electrode group 201 extending in the second direction 02 and a plurality of second branch electrodes 202 connected to both sides of the second stem electrode group 201, and second openings are provided in some or all of the second branch electrodes 202; each of the fourth electrode groups 40 includes a plurality of second electrode blocks 401 corresponding to the plurality of first openings arranged in the second direction 02, and each of the second electrode blocks 401 is located in the corresponding first opening.

It may be understood that, in conjunction with the above related descriptions "at least one of the second branch electrodes 202 is defined with the second opening", "the plurality of second branch electrodes 202 connected to both sides of the second stem electrode group 201", and "the first electrode block 301 is provided in at least one of the second openings", it can be seen that in this embodiment, the first opening is defined in at least one of the first branch electrodes 102, the plurality of first branch electrodes 102 connectedly disposed to both sides of the first stem electrode group 101 and the second electrode blocks 401 are disposed in at least one of the first openings, similarly, thereby further alleviating the attenuation of the electrical signal in the first electrode groups 10, reducing impedance and RC Loading of the first electrode groups 10 and improving the uniformity of light emitted from the subpixels in different areas of the touch layer 100.

Further, as shown in FIG. 2, the first branch electrode 102 may be patterned so as to complicate the shape and path of the first electrode group 10, and increase the peripheral path of the first branch electrode 102, considering that the second branch electrode 202 and the first branch electrode 102 are arranged in the same layer, it is beneficial to increase the areas of the second branch electrode 202 facing the first branch electrode 102, further increasing the parasitic capacitance between the second branch electrode 202 and the first branch electrode 102, and also effectively increasing the amount of capacitance change of the parasitic capacitance between the second branch electrode 202 and the first branch electrode 102.

In an embodiment, as shown in FIG. 2, a plurality of second electrode blocks 401 in a same fourth electrode group 40 are electrically connected (not shown), and each of the fourth electrode groups 40 is electrically connected to a second wire so that the plurality of third electrode groups 30 and the plurality of fourth electrode groups 40 may implement a third function. The third function may be understood as the second function mentioned above, that is, different from the first function. Specifically, whether in a touch phase (i.e., the first period t1) or a distance measuring phase (i.e., the second period t2), the plurality of third electrode groups 30 may be electrically connected to any one of the distance measurement driving pins or the distance measurement sensing pins in the second functional chip, to correspondingly transmit a distance measurement driving signal or a distance measurement sensing signal, and correspondingly, the plurality of fourth electrode groups 40 may be electrically connected to another one of the distance measurement driving pins or the distance measurement sensing pins in the second functional chip to correspondingly transmit a distance measurement driving signal or a distance measurement sensing signal, thereby implementing a distance measuring function.

It may be understood that, on one hand, since the first openings are provided in this embodiment, the space in the first opening is fully utilized by providing the corresponding second electrode block 401 in the first opening in this embodiment, so that the extra reserved space to place the second electrode block 401 is avoided, and the distance measuring function may be realized while saving the space of the touch layer 100; on the other hand, in the present embodiment, the plurality of third electrode groups 30 and the plurality of fourth electrode groups 40 which are not used to realize the touch function are used to implement the distance measuring function, so that signal interference or delay caused by the multiplexing of the electrode groups may be avoided, and the reliability of the touch function and the distance measuring function may be further improved.

Specifically, the plurality of third electrode groups 30 are interconnected or arranged to be insulated from each other, and the plurality of fourth electrode groups 40 are interconnected or arranged to be insulated from each other. Specifically, when one of the plurality of third electrode groups 30 and the plurality of fourth electrode groups 40 are electrically connected, and the other are insulated from each other, reference may be made to the foregoing description with respect to that the plurality of third electrode groups 30 are connected to each other, and the plurality of third electrode groups 30 and the plurality of first electrode groups 10 are used to implement the second function; alternatively, when the plurality of third electrode groups 30 are disposed to be insulated from each other and two of the plurality of fourth electrode groups 40 are disposed to be insulated from each other, reference may be made to the foregoing description with respect to the plurality of third electrode groups 30 insulated from each other, and the plurality of third electrode groups 30 and the plurality of first electrode groups 10 used to implement the second function; or, as shown in FIG. 3, when the plurality of third electrode groups 30 are connected to each other and the plurality of fourth electrode groups 40 are connected to each other (not shown), the plurality of fourth electrode groups 40 connected to each other may be electrically connected to a distance measurement driving pins in the second functional chip through a fourth peripheral wire (not shown) to transmit a plurality of distance measurement driving signals to the touch layer 100, and the plurality of third electrode groups 30 connected to each other are electrically connected to a distance measurement sensing pins in the second functional chip through the third peripheral wire 903, to transmit generated corresponding distance measurement sensing signals to the second functional chip.

In an embodiment, as shown in FIGS. 2 and 3, the plurality of first electrode groups 10 and the plurality of second electrode groups 20 intersect to form a plurality of touch cells 50, the touch cells 50 are arranged in the first direction 01 and the second direction 02, the touch cell 50 include a first electrode 501, a second electrode 502, and a third electrode 503, the first electrode 501 is disposed around the second electrode 502; in the first direction 01, every two adjacent first electrodes 501 in the plurality of touch cells 50 are electrically connected to form one corresponding first electrode group 10, every two adjacent third electrodes 503 in the plurality of touch cells 50 are electrically connected to form one corresponding third electrode group 30, and two second electrodes 502 in the two adjacent touch cells 50 are insulated from each other; in the second direction 02, every two adjacent second electrodes 502 in the plurality of touch cells 50 are electrically connected to form one corresponding second electrode group 20, and two first electrodes in the two adjacent touch cells 50 are insulated from each other.

Here, an example, in which the first direction 01 is a vertical upward direction or a vertical downward direction, and the second direction is a horizontal left direction or a horizontal right direction, is described, that is, the plurality of touch cells 50 may be arranged in a matrix in the vertical direction and the horizontal direction. It may be understood that, in the present embodiment, the plurality of first electrode groups 10 and the plurality of second electrode groups 20 are arranged as the plurality of touch cells 50 arranged in a matrix, that is, each of the touch cells 50 may serve as a touch recognition unit, and the touch layer 100 may include a plurality of touch recognition units arranged in an array. It can be seen from the above discussion that, the second electrode 502 in each of the touch cells 50 is disposed around the first electrode 501, that is, the outer edge of the first electrode 501 is surrounded by the outer edge of the second electrode 502, thereby effectively increasing the opposing areas of the second electrode 502 and the first electrode 501, so as to increase the parasitic capacitance between the second electrode 502 and the first electrode 501, and also effectively increase the amount of capacitance change of the parasitic capacitance between the second electrode 502 and the first electrode 501.

The third electrode 503 may be understood as, but is not limited to, the first electrode block 301 described above. Here, an example, in which the third electrode 503 may be the first electrode block 301 described above, is described. Specifically, in conjunction with FIGS. 2 and 7, in the first direction 01, the two second electrodes 502 located in the two adjacent touch cells 50 are disposed spacedly to be insulated from each other, the two first electrodes 501 located in the two adjacent touch cells 50 are connectedly disposed to be electrically connected to each other, and the two third electrodes 503 located in the two adjacent touch cells 50 are electrically connected by a corresponding bridge 302; in the second direction 02, the two second electrodes 502 located in the two adjacent touch cells 50 are connectedly disposed to be electrically connected to each other, two first electrodes 501 located in the two adjacent touch cells 50 are electrically insulated by at least one second electrode 502, two third electrodes 503 located in the two adjacent touch cells 50 are electrically insulated by at least one second electrode 502, and the two third electrodes 503 located in the same touch cell 50 are electrically insulated by a corresponding first electrode 501.

Figure 7:
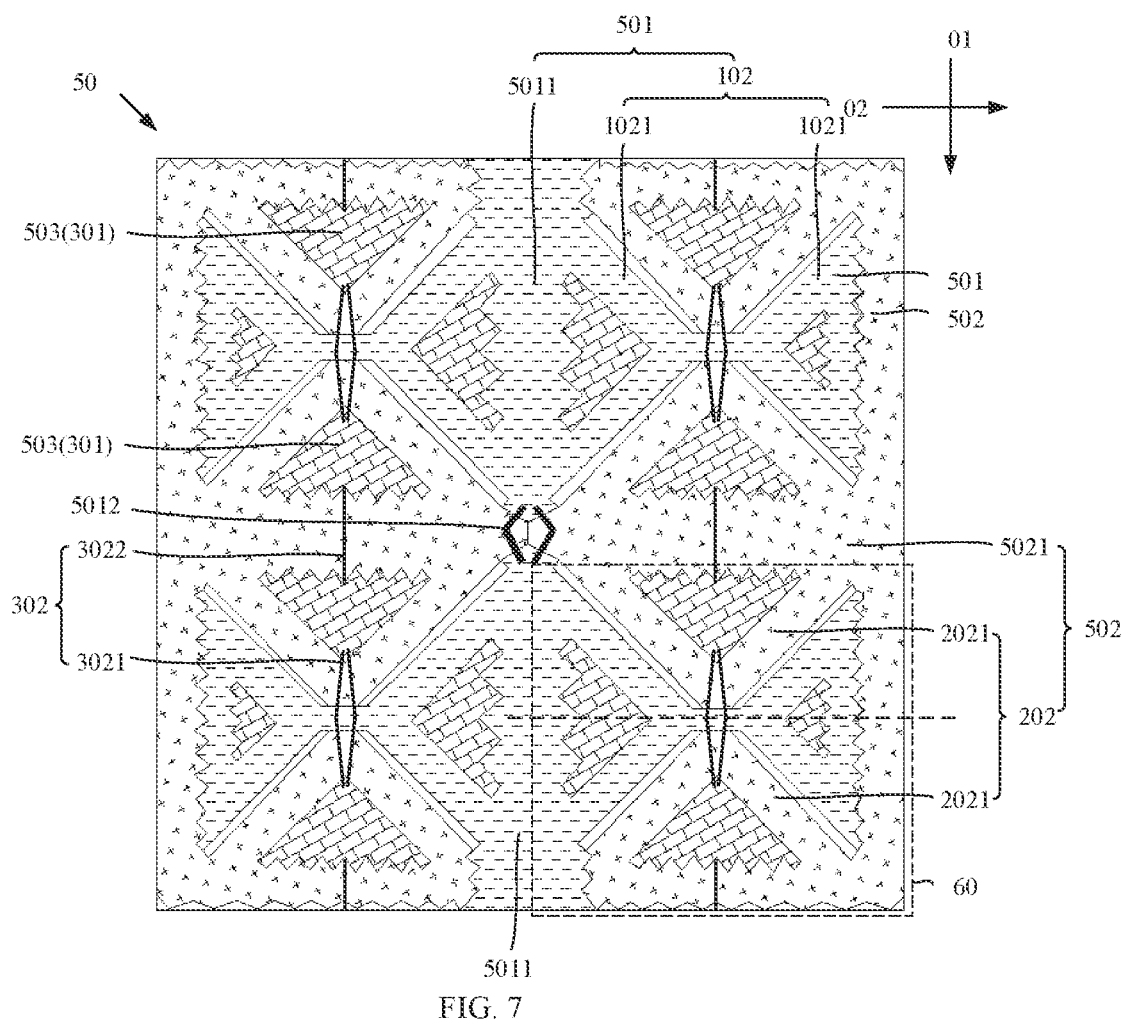
FIG. 7 is a schematic top view of a touch cell in a touch layer according to an embodiment of the present application.

In an embodiment, in conjunction with FIGS. 2 and 7, in a touch cell 50, the first electrode 501 includes two first stem electrodes 5011 arranged in the first direction 01, the second electrode 502 includes a second stem electrode 5021 extending in the second direction 02, and the two first stem electrodes 5011 in a same first electrode 501 are electrically connected by a bridge 5012 insulated from the second stem electrode 5021. Specifically, as shown in FIG. 7, the second stem electrode 5021 and the two first stem electrodes 5011 located on both sides of the second stem electrode 5021 may be disposed in a same layer, an insulating material may be disposed between the bridge 5012 and the second stem electrode 5021 for insulating, and a number and shape of the bridge 5012 connected between the two first stem electrodes 5011 are not limited herein.

In an embodiment, as shown in FIG. 7, the touch cell 50 includes four repeating units 60 arranged in a matrix and symmetrical about a center of the touch cell 50, the first electrode 501 includes a plurality of first branch electrodes 102 connected to both sides of the first stem electrode 5011, and the second electrode 502 further includes second branch electrodes 202 connected to the second stem electrode 5021; in each of the repeating units 60, the first branch electrode 102 includes two first sub-branch electrodes 1021 arranged in axial symmetry and connected to each other, the symmetry axis of the two first sub-branch electrodes 1021 is parallel to the first direction 01, a first opening is defined in each of the first sub-branch electrodes 1021, a fourth electrode 504 is provided in each of the first opening; in each of the repeating units 60, the second branch electrode 202 includes two second sub-branch electrodes 2021 arranged in axial symmetry and connected to each other, the symmetry axis of the two second sub-branch electrodes 2021 is parallel to the second direction 02, a second opening is provided in each of the second sub-branch electrodes 2021, a third electrode 503 is provided in each of the second opening, and a plurality of the third electrodes 503 arranged along the first direction 01 are electrically connected to form one third electrode group 30. Specifically, as shown in FIG. 7, the first sub-branch electrodes 1021 in the repeating units 60 may be triangular shape, and the two vertices of the two first sub-branch electrodes 1021 may be disposed oppositely and extend toward each other to be connected to form the two first sub-branch electrodes 1021 which are axially symmetric; the second sub-branch electrode 2021 in the repeating unit 60 may include a triangle and a connection line section connected to a bottom edge of the triangle, the connection line section is parallel to the first direction 01, the two vertices of the two second sub-branch electrodes 2021 may be disposed oppositely and disconnected, and the two connection line sections may be disposed oppositely and extend toward each other to be connected, thereby forming the two axially symmetric second sub-branch electrodes 2021.

Of course, at least one of shape and size of the first branch electrode 102 may be same as or different from that of the second branch electrode 202. Further, shape of the first opening provided in the first sub-branch electrode 1021 may be consistent with a shape of a outer contour of the first sub-branch electrode 1021, and the shape of the second opening positioned in the second sub-branch electrode 2021 may be consistent with a shape of a outer contour of the second sub-branch electrode 2021, thereby maximizing the sizes of the first opening and the second opening. Further, the edge of the first sub-branch electrode 1021 and a corresponding edge of the fourth electrode 504 oppositely disposed may be in a zigzag shape, and they are mutually embedded, similarly, the edge of the second sub-branch electrode 2021 and the corresponding edge of the third electrode 503 oppositely disposed may be in a polygonal line, and they are mutually embedded, wherein a maximum size of an edge in a convex direction of the zigzag shape may be no less than a size of one subpixel to avoid shielding the corresponding subpixel.

In an embodiment, as shown in FIG. 7, in the first direction 01, the bridge 302 includes a first bridge 3021 within the repeating unit 60 and a second bridge 3022 between two adjacent repeating units 60; the first bridge 3021 crosses and is insulated from the connecting portions between the two first sub-branch electrodes 1021 disposed in axial symmetry, and extends along both sides in the first direction 01 to be electrically connected to the two third electrodes 503 in a same repeating unit 60, and the second bridge 3022 crosses and is insulated from the corresponding second stem electrode 5021 to be electrically connected to two third electrodes 503 included in the two adjacent repeating units 60. Specifically, number and shape of the first bridge 3021 located within the repeating unit 60 and number and shape of the second bridge 3022 located between two adjacent repeating units 60 are not limited here. It should be noted that, in conjunction with FIGS. 2, 3 and 7, the second bridge 3022 also crosses and is insulated from the corresponding second sub-branch electrode 2021 located at the edge of the touch layer 100 to electrically connect the corresponding plurality of the third electrodes 503 to the third peripheral wire 903.

In an embodiment, the first electrode groups 10, the second electrode groups 20, and the third electrode groups 30 are formed in a metal grid, and each of the first electrode groups 10, the second electrode groups 20, and the third electrode groups 30 is disposed to be insulated from each other through a fracture of the metal grid. It will be understood that the constituent materials and unit structures of the first electrode groups 10, the second electrode groups 20, and the third electrode groups 30 formed in the metal grid may be same. It can be seen from the above analysis that differences among the three film layer structures may be further reduced so as to maintain the uniformity of light output from the subpixels in the different regions of the touch layer 100. Specifically, the fracture is formed at an edge of the metal grid, and the distance between any two adjacent fractures is sufficient to insulate the three. Similarly, the fourth electrode group 40 may also be constructed of the metal mesh, for details, please refer to the relevant description of the metal mesh above.

Specifically, the metal grid may include a metal structure and a plurality of hollow areas surrounded by the metal structure. Further, the metal structure may include a closed-shaped metal frame and a metal connection line connected between the two metal frames, the metal connection line electrically connects the corresponding two metal frames. The projection of the metal structure on the cathode layer may be, but is not limited to, an ellipse, a circle, or a rectangular frame. Further, a side of the metal frame and an edge of the metal mesh may form a boundary seal of the metal mesh, and of course, the metal connection line located at the edge of the metal mesh or an incomplete seal of an incomplete metal frame may also form the boundary seal.

In an embodiment, the touch panel further includes a pixel layer, the pixel layer and the touch layer 100 are disposed opposite to each other, the pixel layer includes a plurality of subpixels, the metal grid includes a plurality of grid cells, and each of the subpixels is located in a corresponding grid cell. Specifically, as discussed above, an inside of the grid cell may be understood as a corresponding hollow area, that is, each of the hollow areas may be defined corresponding to one of the subpixels, and the edge of the subpixel does not exceed the corresponding hollow area, so that the metal mesh may avoid shielding any of the subpixels, thereby avoid reducing the amount of light output of the touch panel.

The present application further provides a mobile terminal including a terminal body and a touch panel as described above, the terminal body and the touch panel are integrated. The mobile terminal may be, but is not limited to, a display device such as a mobile phone, a computer, or a wristwatch.

A touch panel and a mobile terminal are provided by the embodiments of the present application, the touch panel includes a touch layer and a functional chip, the touch layer includes: a plurality of first electrode groups, the plurality of first electrode groups extend in a first direction and arranged in a second direction; a plurality of second electrode groups, the plurality of second electrode groups extend in the second direction and arranged in the first direction, the plurality of first electrode groups and the plurality of second electrode groups are electrically connected to the functional chip; a plurality of third electrode groups, the plurality of third electrode groups extend in the second direction and arranged in the first direction, any of the first electrode groups, any of the second electrode groups and any of the third electrode groups are insulatedly disposed; wherein the plurality of third electrode groups are connected to each other and electrically connected to a third peripheral wire to be electrically connected to the functional chip, or the plurality of third electrode groups are disposed to be insulated from each other and each of the third electrode groups is connected to a corresponding first wire to be electrically connected to the functional chip. Compared with the prior art, the plurality of third electrode groups for implementing the corresponding functions in the present application are also located in the touch layer, that is, it may avoid providing a structure independent of the touch layer to implement the corresponding functions, the manufacturing difficulty and cost of the touch panel and the mobile terminal are reduced, and the development of a smartphone having a distance sensing function is facilitated.

The touch panel and the mobile terminal provided in the embodiments of the present application are described in detail above. Specific examples are used in this article to illustrate the principles and implementations of the present disclosure. The description of the embodiments is merely intended to help understand the technical solutions and core ideas of the present application. Those of ordinary skill in the art should appreciate that they may still modify the technical solutions described in the foregoing embodiments, or equivalently replace some of the technical features therein; these modifications or substitutions do not deviate the nature of the respective solutions from the scope of the technical solutions of the embodiments of the present application.

What is claimed is:

1. A touch panel comprising a touch layer and a functional chip, wherein the touch layer comprises:
   a plurality of first electrode groups extending in a first direction and arranged in a second direction;
   a plurality of second electrode groups extending in the second direction and arranged in the first direction, wherein the plurality of first electrode groups and the plurality of second electrode groups are electrically connected to the functional chip; and
   a plurality of third electrode groups, wherein the first electrode groups, the second electrode groups, and the third electrode groups are disposed insulated from each other,
   wherein the plurality of third electrode groups are connected to each other and electrically connected to a third peripheral wire to be electrically connected to the functional chip, or the plurality of third electrode groups are disposed insulated from each other and each of the third electrode groups is connected to a corresponding first wire to be electrically connected to the functional chip;
   wherein each of the second electrode groups comprises a second stem electrode group extending in the second direction and a plurality of second branch electrodes connected to both sides of the second stem electrode group, and second openings are defined in some or all of the second branch electrodes;
   wherein the plurality of third electrode groups extend in the first direction and are arranged in the second direction, each of the third electrode groups comprises a plurality of first electrode blocks corresponding to a plurality of the second openings arranged in the first direction, each of the first electrode blocks is located in a corresponding second opening, and the plurality of first electrode blocks in a same third electrode group are electrically connected;
   wherein the plurality of first electrode groups and the plurality of second electrode groups intersect to form a plurality of touch cells, the plurality of touch cells are arranged in the first direction and the second direction, each of the touch cells comprises a first electrode, a second electrode, and a third electrode, the first electrode is disposed around the second electrode.

2. The touch panel of claim 1, wherein during a first period, each of the first electrode groups is electrically connected to a corresponding first peripheral wire, and each of the second electrode groups is electrically connected to a corresponding second wire, so that the plurality of first electrode groups and the plurality of second electrode groups perform a first function; and during a second period, each of the second electrode groups is electrically connected to a corresponding second peripheral wire, so that the plurality of third electrode groups and the plurality of first electrode groups perform a second function.

3. The touch panel of claim 1, wherein the touch layer further comprises:

a plurality of fourth electrode groups extending in the second direction and arranged in the first direction, wherein the first electrode groups, the second electrode groups, the third electrode groups and the fourth electrode groups are insulated;

wherein each of the first electrode groups comprises a first stem electrode group extending in the first direction and a plurality of first branch electrodes connected to both sides of the first stem electrode group, and first openings are defined in some or all of the first branch electrodes;

wherein each of the fourth electrode groups comprises a plurality of second electrode blocks corresponding to a plurality of first openings arranged in the second direction, and each of the second electrode blocks is located in a corresponding first opening.

4. The touch panel of claim 3, wherein the plurality of second electrode blocks in a same fourth electrode group are electrically connected, and each of the fourth electrode groups is electrically connected to a second wire, so that the plurality of third electrode groups and the plurality of fourth electrode groups perform a third function.

5. The touch panel of claim 1, wherein:

in the first direction, every two adjacent first electrodes in the plurality of touch cells are electrically connected to form a corresponding one of the first electrode groups, every two adjacent third electrodes in the plurality of touch cells are electrically connected to form a corresponding one of the third electrode groups, and two second electrodes in two adjacent touch cells are disposed insulated from each other;

in the second direction, every two adjacent second electrodes in the plurality of touch cells are electrically connected to form a corresponding one of the second electrode groups, and two first electrodes in two adjacent touch cells are disposed insulated from each other.

6. The touch panel of claim 5, wherein in the touch cell, the first electrode comprises two first stem electrodes arranged in the first direction, the second electrode comprises the second stem electrode extending in the second direction, and the two first stem electrodes in a same first electrode are electrically connected by a bridge insulated from the second stem electrode.

7. The touch panel of claim 6, wherein each of the touch cells comprises four repeating units arranged in a matrix and symmetric about a center of the touch cell, the first electrode further comprises a plurality of first branch electrodes connected to both sides of the first stem electrode, and the second electrode further comprises the second branch electrodes connected to the second stem electrode;

in each of the repeating units, the first branch electrode comprises two first sub-branch electrodes arranged in axial symmetry and connected to each other, a symmetry axis of the two first sub-branch electrodes is parallel to the first direction, in each of the repeating units, the second branch electrode comprise two second sub-branch electrodes arranged in axial symmetry and connected, a symmetry axis of the two second sub-branch electrodes is parallel to the second direction, a second opening is defined in each of the second sub-branch electrodes, a third electrode is provided in each of the second openings, and a plurality of third electrodes arranged in the first direction are electrically connected to form one of the third electrode groups.

8. A touch panel, wherein the touch panel comprises a touch layer and a functional chip, the touch layer comprises:

a plurality of first electrode groups extending in a first direction and arranged in a second direction;

a plurality of second electrode groups extending in the second direction and arranged in the first direction, the plurality of first electrode groups and the plurality of second electrode groups are electrically connected to the functional chip; and a plurality of third electrode groups, wherein the first electrode groups, the second electrode groups and the third electrode groups are disposed insulated from each other;

wherein the plurality of third electrode groups are connected to each other and electrically connected to a third peripheral wire to be electrically connected to the functional chip, or the plurality of third electrode groups are disposed insulated from each other and each of the third electrode groups is connected to a corresponding first wire to be electrically connected to the functional chip, wherein each of the second electrode groups comprises a second stem electrode group extending in the second direction and a plurality of second branch electrodes connected to both sides of the second stem electrode group, and second openings are defined in some or all of the second branch electrodes;

wherein the plurality of third electrode groups extend in the first direction and are arranged in the second direction, each of the third electrode groups comprises a plurality of first electrode blocks corresponding to a plurality of second openings arranged in the first direction, each of the first electrode blocks is located in a corresponding second opening, and a plurality of first electrode blocks in a same third electrode group are electrically connected.

9. The touch panel of claim 8, wherein during a first period, each of the first electrode groups is electrically connected to a corresponding first peripheral wire, and each of the second electrode groups is electrically connected to a corresponding second wire, so that the plurality of first electrode groups and the plurality of second electrode groups perform a first function; and during a second period, each of the second electrode groups is electrically connected to a corresponding second peripheral wire, so that the plurality of third electrode groups and the plurality of first electrode groups perform a second function.

10. The touch panel of claim 8, wherein the touch layer further comprises:

a plurality of fourth electrode groups extending in the second direction and arranged in the first direction, wherein the first electrode groups, the second electrode groups, the third electrode groups and the fourth electrode groups are insulated;

wherein each of the first electrode groups comprises a first stem electrode group extending in the first direction and a plurality of first branch electrodes connected to both sides of the first stem electrode group, and first openings are defined in some or all of the first branch electrodes;

wherein each of the fourth electrode groups comprises a plurality of second electrode blocks corresponding to a plurality of first openings arranged in the second direction, and each of the second electrode blocks is located in a corresponding first opening.

11. The touch panel of claim 10, wherein a plurality of second electrode blocks in a same fourth electrode group are electrically connected, and each of the fourth electrode groups is electrically connected to a second wire, so that the plurality of third electrode groups and the plurality of fourth electrode groups perform a third function.

12. The touch panel of claim 10, wherein the plurality of fourth electrode groups are connected to each other or insulated from each other.

13. The touch panel of claim 8, wherein the plurality of first electrode groups and the plurality of second electrode groups intersect to form a plurality of touch cells, the plurality of touch cells are arranged in the first direction and the second direction, each of the touch cells comprises a first electrode, a second electrode, and a third electrode, and the first electrode is disposed around the second electrode;

in the first direction, every two adjacent first electrodes in the plurality of touch cells are electrically connected to form a corresponding one of the first electrode groups, every two adjacent third electrodes in the plurality of touch cells are electrically connected to form a corresponding one of the third electrode groups, and two second electrodes in two adjacent touch cells are disposed insulated from each other;

in the second direction, every two adjacent second electrodes in the plurality of touch cells are electrically connected to form a corresponding one of the second electrode groups, and two first electrodes in two adjacent touch cells are disposed insulated from each other.

14. The touch panel of claim 13, wherein in the touch cell, the first electrode comprises two first stem electrodes arranged in the first direction, the second electrode comprises the second stem electrode extending in the second direction, and the two first stem electrodes in a same first electrode are electrically connected by a bridge insulated from the second stem electrode.

15. The touch panel of claim 14, wherein each of the touch cells comprises four repeating units arranged in a matrix and symmetric about a center of the touch cell, the first electrode further comprises a plurality of first branch electrodes connected to both sides of the first stem electrode, and the second electrode further comprises second branch electrodes connected to the second stem electrode;

in each of the repeating units, the first branch electrode comprises two first sub-branch electrodes arranged in axial symmetry and connected to each other, a symmetry axis of the two first sub-branch electrodes is parallel to the first direction, in each of the repeating units, the second branch electrode comprise two second sub-branch electrodes arranged in axial symmetry and connected, a symmetry axis of the two second sub-branch electrodes is parallel to the second direction, a second opening is defined in each of the second sub-branch electrodes, a third electrode is provided in each of the second openings, and a plurality of third electrodes arranged in the first direction are electrically connected to form one of the third electrode groups.

16. The touch panel of claim 15, wherein in the first direction, a first bridge is provided in the repeating unit, and a second bridge is provided between two adjacent repeating units;

wherein the first bridge crosses and is insulated from a connecting portion between the two first sub-branch electrodes disposed in axial symmetry, and extends along both sides in the first direction to be electrically connected to the two third electrodes in a same repeating unit, and the second bridge crosses and is insulated from a corresponding second stem electrode to be electrically connected to two adjacent third electrodes included in the two adjacent repeating units.

17. The touch panel of claim 8, wherein the first electrode groups, the second electrode groups, and the third electrode groups are formed of metal grids, and the first electrode groups, the second electrode groups, and the third electrode groups are disposed insulated from each other through fractures of the metal grids.

18. The touch panel of claim 17, wherein the touch panel further comprises:

a pixel layer disposed opposite to the touch layer, wherein the pixel layer comprises a plurality of subpixels, the metal grid comprises a plurality of grid cells, and each of the subpixels is located in a corresponding grid cell.

19. A mobile terminal, wherein the mobile terminal comprises a terminal body and a touch panel of claim 8, the terminal body and the touch panel are integrated.

* * * * *